United States Patent Office 3,829,372

Patented Aug. 13, 1974

3,829,372

MULTILAYER MAGNETIC STRUCTURE AND METHODS OF MAKING SAME

Johannes Heller, Eschenbrunnlestr, Germany, assignor to International Business Machines Corporation, Armonk, N.Y.

No Drawing. Filed May 25, 1972, Ser. No. 257,041
Int. Cl. C23c *15/00;* H01f *10/02*
U.S. Cl. 204—192 5 Claims

ABSTRACT OF THE DISCLOSURE

A multilayer magnetic structure comprising at least four alternating layers of a magnetic material and its oxide, upon a substrate, whereby a desired combination of magnetic properties and wear resistance is achieved. A method of making is also disclosed. Uses include magnetic disk storage applications.

FIELD OF THE INVENTION

Multilayer magnetic structures and methods of making same. Such methods include reactive deposition of a magnetic metal upon a substrate to achieve a structure comprising alternating layers of a magnetic metal and its oxide.

BACKGROUND OF THE INVENTION

The invention relates to a method for depositing magnetizable layers onto substrates such as by means of DC or RF sputtering at extremely low pressures, i.e. $1–10^{-3}$ Torr, and the resulting structure.

When methods of this type are applied to the manufacture of magnetic record carriers, special demands must be met as to the layer properties, apart from the characteristics for magnetic recording. This applies particularly in those cases where high recording densities are required to match the continuously increasing operating speeds in computers.

In magnetic recording systems requiring very high bit densities, the following characteristics are desired:

1. use of thin films consisting of continuous media, with magnetic layer thicknesses in the order of $10^3$
2. negligible distance between the magnetic head and recording layer Apart from the high demands concerning favorable magnetic properties, i.e. high coercivity with high remanence and high rectangularity and rise time of the hysteresis loop, equally high demands have to be made to the wear resistance of the magnetic recording layer in view of the low head flying heights. Intermittent contact between the magnetic head and recording surface though undesirable is to be expected from time to time. Thus, the magnetic recording layer must also be highly wear-resistant.

SUMMARY OF THE INVENTION

Thus, an object of the present invention is to provide a magnetizable recording media and a method for making a magnetizable recording media which, apart from high coercivity with high remanence and high rectangularity and rise time of the hysteresis loop, also shows an extremely high wear resistance.

According to the invention, this object is achieved in that a magnetizable and oxidizable metal is sputtered in an inert gas-oxygen atmosphere under periodic alternation between a substantially neutral and an oxidizing atmosphere by corresponding partial pressure changes of the oxygen, in such a manner that metal and oxide layers are alternatingly deposited on the substrate. In a particularly advantageous method according to the invention, the method adopted is that upon the sputtering of iron in an argon-oxygen atmosphere with a power of 2,000 Watts, and using a target of 200 mm. diameter, the partial pressure alternation of the oxygen takes place between the pressure zone below and above $3.7 \times 10^{-4}$ Torr, upon a total pressure of approximately $1.5 \times 10^{-2}$ Torr.

GENERAL DESCRIPTION

It is known to make magnetic oxide films of $Fe_3O_4$ by means of spinning iron nitrate solutions onto rotating substrates. In that process, the initially formed $Fe_2O_3$ first has to be reduced in a controlled $H_2$-atmosphere at 300–350° C., to $Fe_3O_4$. This is a disadvantage as, apart from the relatively large apparatus required, several process steps are necessary. The production of magnetic oxides by cathode sputtering, which in itself would be more advantageous, has been possible up to now only at relatively high temperatures, as e.g. specified in Soviet Physics-Crystallography, Volume 11, No. 2, Sept./Oct. 1966, pp. 314 and 315. It is shown there that at low substrate temperatures the deposited films are amorphous and paramagnetic, and consequently quite unsuitable for the above specified purposes.

In this invention the magnetic properties of the film to be deposited are advantageously controlled by varying the deposition rate relation between metal and oxide layer when making the recording layer. In practical application, it has become evident that with the recording layers as disclosed by the invention coercive forces of 400 oe. to 700 oe. can be easily reached.

Upon closer investigation of the sputtering process embodiment of the present invention, the following is a desired embodiment. An RF sputtering device for sputtering iron in an oxygen-argon atmosphere with a sputtering power of 2,000 Watts referred to a target of 200 mm. diameter, is employed. The total pressure is $1.5 \times 10^{-2}$ Torr, the rare gas used being argon. This total pressure is maintained by controlled supply and discharge of the operating gases in the jar.

The partial pressure development of the oxygen in the jar represents a periodic process. For initiating this periodic process the valve in the supply line of the oxygen, according to the method as disclosed by the invention, is advantageously controlled by a servo mechanism according to a given program, said mechanism being known per se and not requiring to be explained here in detail. This program considers, among other items, the deposition rate ratio, layer thicknesses etc. It is consequently adapted to the program as required.

It is evident in that connection that as a function of the oxygen partial pressure in the gas discharge, chemically and magnetically differing film depositions are formed. The results obtained show that upon the transition from lower to higher oxygen partial pressures, starting with $10^{-5}$ Torr, there is first a soft-magnetic, metallic deposition which, in the pressure zone immediately below $3.7 \times 10^{-4}$ Torr, changes into a hard-magnetic, metallic deposition. The coercive force in the deposited, hard-magnetic, metallic layer amounts to 160 oe. approximately. The depositions have been analyzed, with the result that the metallic layers, apart from metallic iron, also contain 10–20% of a $Fe_2O_3$ which then, with increasing partial pressure, is responsible for the growing hard-magnetic characteristics. If then the oxygen partial pressure is increased over $3.7 \times 10^{-4}$ Torr, an amorphous oxide film consisting of $Fe_2O_3$ is deposited. It can be demonstrated that this oxide film shows slightly superparamagnetic properties above the mentioned pressure, and that it changes into a paramagnetic oxide film under the influence of higher oxygen partial pressures. The pressure limit between the deposition of the metallic film and the oxidic film deposited thereon can be precisely defined to the value of $3.7\times10^{-4}$ Torr with approximately $\pm0.1\times10^{-4}$ Torr, taking into consideration the above-given sputtering conditions.

This behavior upon the changing of the partial pressure of oxygen, with cathode sputtering of iron being employed, is made use of in the manufacture of wear-resistant magnetic films. As already specified above, the partial pressure of the oxygen is periodically varied during the coating or sputtering process, respectively, between the pressure zone below $3.7\times10^{-4}$ Torr and a pressure between $10^{-3}$ and $10^{-2}$ Torr. Thus, the separate iron and iron oxide layers are formed.

In a typical case, a recording layer of the below-described structure is obtained in accordance with the process as disclosed by the invention.

First, 4–10 layers respectively of iron and iron oxide are alternately applied onto the substrate. The respective thickness of the iron layer is approximately 50–200 A., the thickness of the oxide layer amounting to 100–200 A. approximately. Finally, a protective layer of iron oxide of approximately 100–1,000 A. thickness is deposited thereon. Investigations have shown that protective oxide layers with a thickness of approximately 100 A. already fully satisfy the demands specified above.

The magnetic properties of these recording layers can be controlled, by determining the ratio metal-oxide and by the respective layer thickness of the iron layers, particularly as several alternating layers of iron and iron oxide can easily be used, as described above. It has become evident that the recording layers made in the manner specified above can reach coercive forces of 400 to 700 oe.

The wear resistance of the iron oxide layers is entirely comparable to that of silicon dioxide layers, as shown by known wear tests.

While the sputtering method is shown, the alternating magnetic layer structure can be made by other deposition techniques as well, such as by vapor deposition in a periodically varying oxygen-containing atmosphere. Most preferaby, vacuum deposition may be used. At least four layers of material should be used to obtain the balance between magnetic properties as desired and hardness or wear resistance of the final layers. By using alternating layers, no one layer is so thick that spalling occurs, and thus adhesion is helped. Also, a cushioning effect is possible should head-media contact occur, due to the relative hardness of the alternating layers.

What is claimed is:

1. In the method of making a magnetic media upon a substrate by sputtering from a target to the substrate, the improvement comprising:

sputtering iron in an inert gas-oxygen atmosphere under periodic alternation between a substantially neutral and an oxidizing atmosphere by corresponding partial pressure changes of the oxygen at substantially $3.7\times10^{-4}$ Torr upon a total pressure of substantially $1.5\times10^{-2}$ Torr, to alternatingly deposit upon the substrate at least four layers of magnetic iron and magnetic iron oxide, respectively.

2. The method of claim 1 wherein the final layer is the metal oxide layer and is thicker than preceding oxide layers to achieve a wear resistant final layer.

3. The method of claim 1 wherein alternating layers of iron with a thickness of 50–200 A. and iron oxide with a thickness of 100–250 A. are deposited onto the substrate.

4. The method of claim 1 wherein the final iron oxide layer is between 100–1000 A. as a protection layer.

5. In the method of depositing a magnetic media upon a substrate, the improvement comprising vapor depositing iron in an atmosphere containing a partial pressure of oxygen under periodic alternation between a substantially neutral and an oxidizing atmosphere by corresponding partial pressure changes of the oxidizing gas to alternatingly deposit upon the substrate at least four layers of magnetic iron and magnetic iron oxide, respectively.

References Cited

UNITED STATES PATENTS

| | | | |
|---|---|---|---|
| 3,077,444 | 2/1963 | Hoh | 204—192 |
| 3,160,576 | 12/1964 | Eckert | 204—192 |
| 3,475,309 | 10/1969 | Brook et al. | 204—192 |
| 3,530,055 | 9/1970 | Maissel et al. | 204—192 |

JOHN H. MACK, Primary Examiner

D. R. VALENTINE, Assistant Examiner

U.S. Cl. X.R.

117—239, 240